United States Patent [19]

Helm

[11] Patent Number: 4,512,828

[45] Date of Patent: Apr. 23, 1985

[54] CABLE HOLDING AND POSITIONING APPARATUS AND SPLICING METHOD

[76] Inventor: Emanuel Helm, 528 E. Capitol Ave., Bismarck, N. Dak. 58501

[21] Appl. No.: 565,280

[22] Filed: Dec. 27, 1983

[51] Int. Cl.³ .............................................. H01B 13/00
[52] U.S. Cl. ...................................... 156/49; 29/755;
29/868; 140/115; 140/119; 140/149; 156/502;
174/88 R; 269/903
[58] Field of Search ...................... 57/22, 23, 202, 310;
140/115, 119, 149; 156/49, 502; 174/84 R, 86,
88 R; 269/903, 909; 29/745, 755, 868

[56] References Cited

U.S. PATENT DOCUMENTS

| | | | |
|---|---|---|---|
| 3,198,220 | 8/1965 | Scamberti | 140/119 |
| 3,297,060 | 1/1967 | Richardson | 140/119 X |
| 3,425,203 | 2/1969 | Schillebeeckx | 140/149 X |
| 3,548,889 | 12/1970 | Suzuki | 140/119 |
| 3,884,276 | 5/1975 | Poplaski | 140/115 |
| 3,957,092 | 5/1976 | Loy et al. | 140/115 |
| 4,388,953 | 6/1983 | Hara et al. | 140/149 |

Primary Examiner—Robert Dawson
Attorney, Agent, or Firm—Kinney & Lange

[57] ABSTRACT

An apparatus for holding and positioning a cable is used to help splice large diameter multi-conductor cable end portions to each other. The apparatus includes a support frame having a first clamping mechanism for clamping a first cable end portion movably positioned on one end of the support frame and a second clamping mechanism for clamping a second cable end portion positioned on the support frame proximate the other end. After the individual strands of the cable end portions are spliced together, the first clamping mechanism is moved away from the second clamping mechanism, stretching the spliced section of the cable end portions, drawing individual conductors together so that the spliced section of the cable end portions can be properly reinsulated.

16 Claims, 10 Drawing Figures

CABLE HOLDING AND POSITIONING APPARATUS AND SPLICING METHOD

BACKGROUND OF THE INVENTION

1. Field of the Invention

The present invention relates to splicing apparatus, and in particular, it relates to apparatus used for supporting multi-strand large diameter electric cable during splicing.

2. Description of the Prior Art

In the past, large diameter multi-conductor cables have been a problem to splice. One use of large diameter multi-conductor cables is to supply electric power to large drag lines and other equipment used in open pit mines. The drag lines include a number of electric motors that consume large quantities of electric power. Typically, the cables have a diameter of two to four inches and include three one-inch solid copper conductors, with a couple of half-inch diameter ground conductors and a control wire that interrupts the flow of electricity if the cable is damaged. Generally, the cables are used in 1,000 foot lengths and are laid on the ground with one end being connected to a substation and the other end being connected to the drag line.

Since the multi-conductor cables lie on the ground, the cable occasionally is damaged by a piece of machinery, such as a bulldozer running over the cable. When the cable is damaged, the control wire shuts down the substation and stops the power flow to the drag line. The cable must then be immediately repaired or replaced to avoid the cost of an idle drag line.

One prior art method of repairing large diameter multi-conductor cables includes cutting the cable at the damaged spot and peeling back the insulation, including the insulation around the conductors, ground wires and control wire at each end of the cut cable. The individual conductors, ground wires and control wires, are then placed into individual sockets in a large aluminum connector. Both ends of the cable are connected by attachment to the aluminum connector. There are two major disadvantages to the aluminum connector. First, the aluminum connector is very costly, typically costing in excess of $3,000.00. Second, the aluminum connector does not permit the multi-conductor cable to be wound back on a spool properly since the connector has a much larger diameter than the cable.

Another prior art method of splicing large multi-conductor cables includes cutting the cable at the damaged spot, nailing or retaining in some other way both ends of the damaged cable on a table or other support surface. The insulation is then peeled back and the individual conductors are pulled apart. The conductors are individually spliced by soldering or crimping using a crimping sleeve.

Since the individual conductors have been pulled apart from each other, the spliced conductors must then be brought together so that the spliced section can be properly reinsulated. The spliced portion is then placed in a mold and the exposed conductors are wrapped with insulating tape. An insulative rubber compound is then poured within the mold.

The spliced section made by the immediately-above mentioned method is often times inadequate. Since the conductors are one-inch diameter solid copper, they are difficult to handle and are not properly positioned together. A bulldozer or other heavy piece of equipment is used to lay the cable and the spliced section of the cable is subjected to great stretching forces. These forces move the individual conductors with respect to each other in the spliced area. The movement of the conductors in the cured rubber compound breaks down the insulative qualities of the rubber.

There are several prior art patents which disclose cable splicing devices for splicing multi-conductor cable. These patents include the Martin U.S. Pat. No. 2,802,489, the Brown et al U.S. Pat. No. 3,665,574, the Enright et al U.S. Pat. No. 3,713,214, and the Copas U.S. Pat. No. 3,890,689. However, none of the devices shown in these patents are suitable for holding a large diameter cable during splicing.

SUMMARY OF THE INVENTION

The present invention includes an apparatus and method for holding and positioning large diameter multi-conductor cables during splicing. The apparatus includes a support frame having a support surface. A first clamping mechanism for clamping a first end portion of a cable is movably positioned on the support surface proximate one end of the support frame. A second clamping mechanism for clamping a second end portion of a cable is positioned on the support surface proximate another end of the support frame. A hydraulic piston actuated by a hydraulic system is attached at one end to the support frame and at another end to the first clamping mechanism so that the first clamping mechanism is movable when the hydraulic system is actuated.

The method preferably includes stripping back the insulation from each of the multi-conductors, ground conductors and control wires of the end portions of the cable. Each end portion is positioned within a corresponding clamping mechanism. The individual conductors are then spliced by soldering or crimping. Each conductor is individually insulated from the other conductors. The first clamping mechanism is then moved away from the second clamping mechanism to stretch and straighten the individual conductors, drawing the conductors together. Either the first or the second clamping mechanism is then moved in an angular direction, placing a twist in the spliced portion of the cable. The spliced section is then further insulated in a conventional manner.

DETAILED DESCRIPTION OF THE PREFERRED EMBODIMENTS

Figures 1, 4, 5, 6:
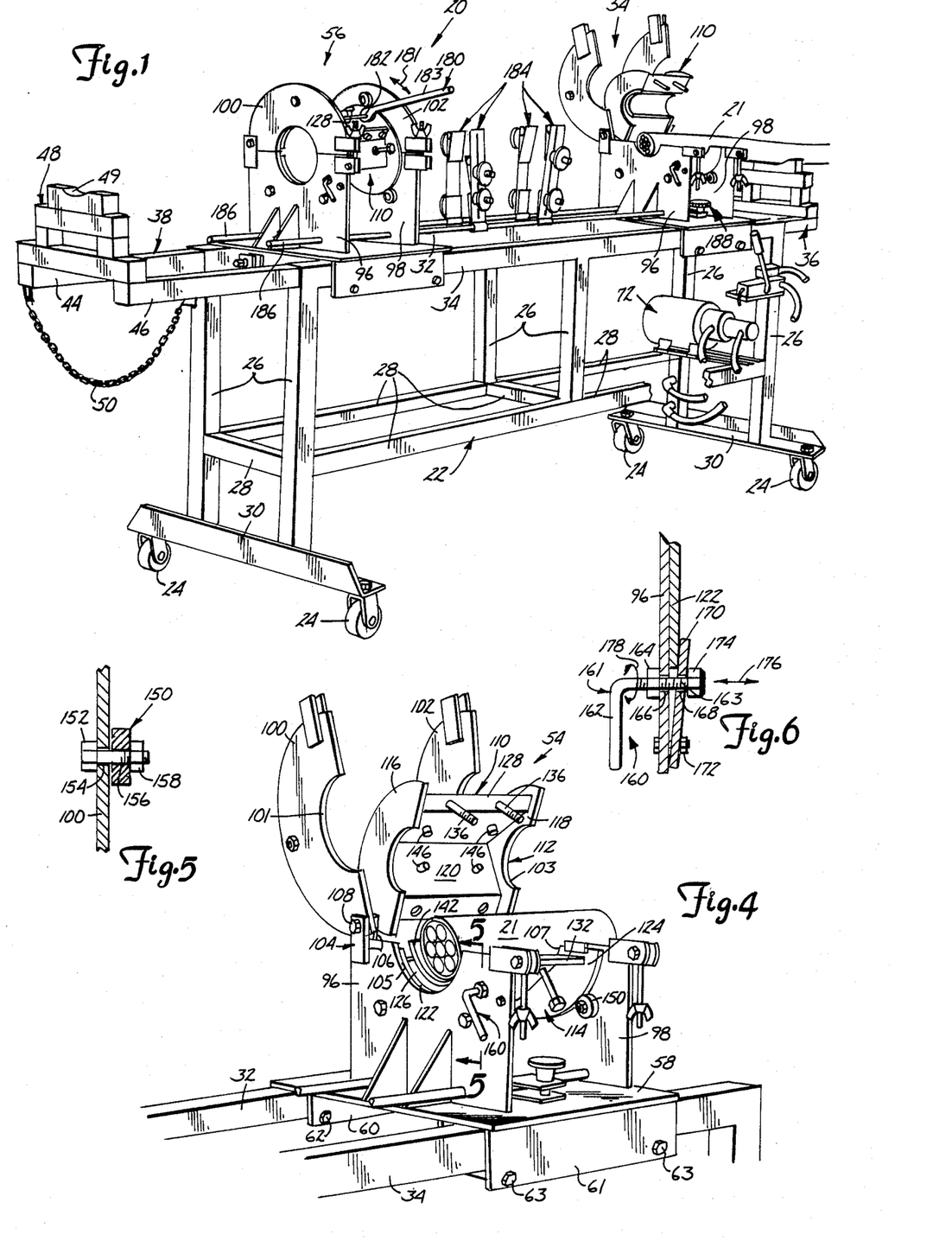
FIG. 1 is a perspective view of the cable splicing apparatus of the present invention.
FIG. 4 is a perspective view of the clamping mechanism of the cable splicing apparatus.
FIG. 5 is a cross-sectional view of the roller of the clamping mechanism taken along the line 5—5 in FIG. 4.
FIG. 6 is a cross-sectional view of the braking device of the clamping mechanism taken along the line 6—6 in FIG. 4.
Figure 2:
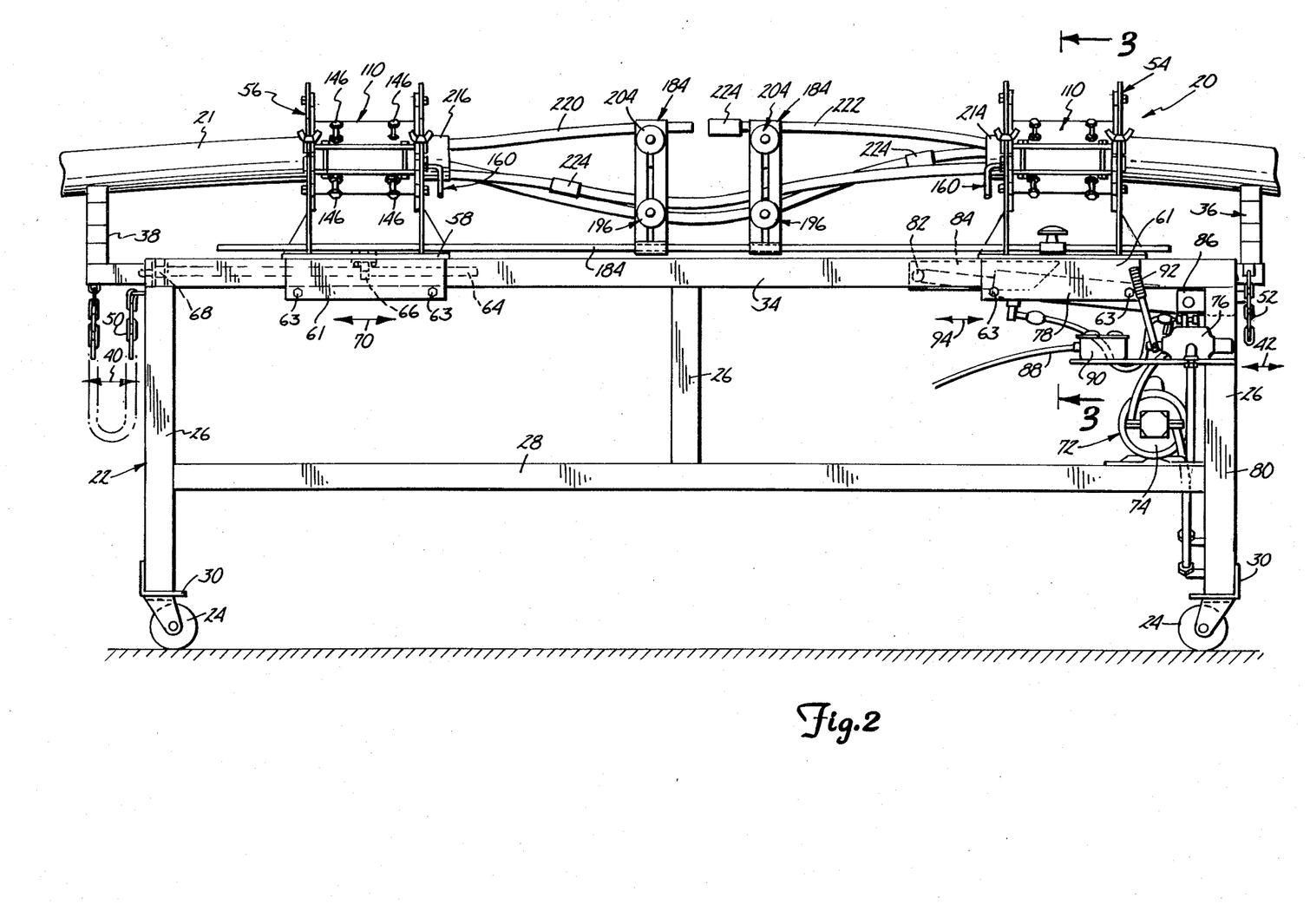
FIG. 2 is an elevational view of the cable splicing apparatus.

The apparatus of the present invention is generally indicated at 20 in FIGS. 1 and 2. Throughout the drawings, like reference characters will be used to indicate like elements. The apparatus 20 is used to support first and second ends of a large diameter multi-conductor cable 21 so that the cable can be spliced, twisted and re-insulated quickly and easily at the site where the cable was damaged. The cable 21 has a diameter generally in excess of two inches, although the apparatus can be used for smaller diameter cables. One commonly used cable has a diameter of approximately four inches and includes three electrical conductors of approximately one-inch diameter each, two ground conductors of approximately one-half inch diameter each, and a control wire.

The apparatus 20 includes a support frame 22 that is mounted on a plurality of casters 24 so that the support frame 22 is easily movable. The support frame 22 further includes a plurality of upright rigid members 26 that are connected to each other by a plurality of rigid horizontal members 28. The casters 24 are preferably attached to rigid horizontal members 30 which are in turn attached to lower ends of the vertical members 26. Although the support frame has been described with specific detail, it should be understood that any suitable support frame is includable within the scope of the present invention.

First and second hollow horizontal guide rails 32, 34, respectively, are attached to the upper end of the rigid vertical members 26. Cable supports 36, 38, respectively, telescope in and out of the hollow guide rails 32 and 34 in directions indicated by arrows 40 and 42, as illustrated in FIG. 2. The cable support 38 includes a first telescoping member 44 that telescopes in and out of the guide rail 32 and a second telescoping member 46 that telescopes in and out of the guide rail 34. The first and second telescoping members 44, 46 are attached to each other at their distal ends by a cable rest 48. The cable rest 48 includes an upwardly facing arcuate surface 49 for resting the cable 21. The cable support 36, although not shown and described in detailed manner as the cable support 38, is similarly constructed and similarly cooperates with the rails 32 and 34. In addition, a first chain 50 prevents the cable support 38 from being pulled out of the rails 32 and 34 and a second chain 52 prevents the cable support 36 from being pulled out of the rails 32 and 34.

Figure 3:
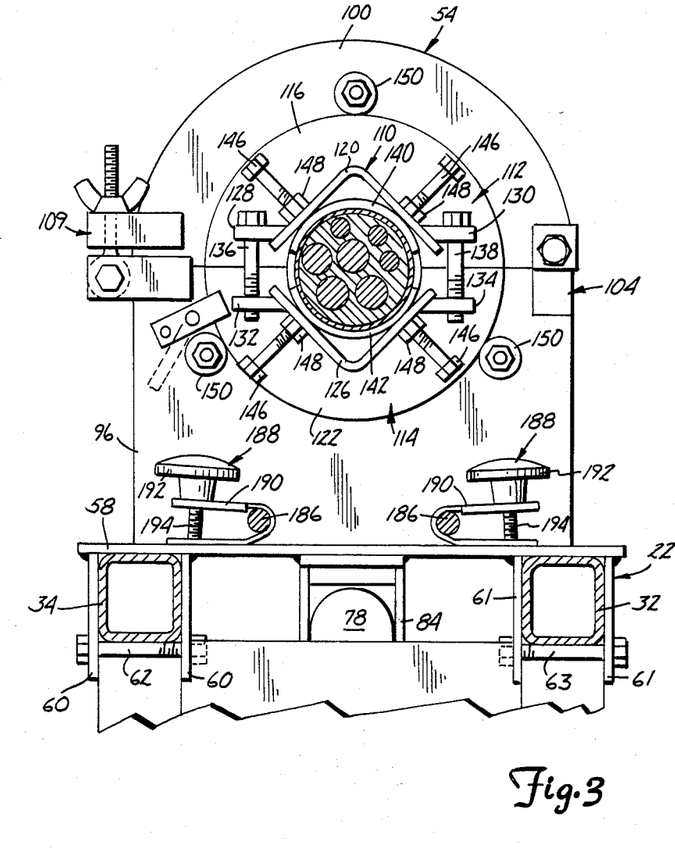
FIG. 3 is a cross-sectional view of the clamping mechanism of the cable splicing apparatus taken along the line 3—3 in FIG. 2.

First and second clamping mechanisms 54, 56, respectively, are disposed on the upper surface of the guide rails 32 and 34, as illustrated in FIGS. 1 and 2. Both clamping mechanisms 54 and 56 engage the rails 32 and 34 in a like manner, and both clamping mechanisms will be described with reference to the clamping mechanism 54, as illustrated in FIGS. 3 and 4. The clamping mechanism 54 includes a base plate 58 and first and second pairs of downwardly extending guide plates 60, 61, respectively, which engage the guide rails 32 and 34 along the guide rails' vertical surfaces, respectively. Bolts 62 extend through the downwardly extending guide plates 60 below the bottom surface of the guide rail 32 retaining the clamping mechanism 54 on the guide rail 32. Likewise, bolts 63 extend through guide plates 61 below the bottom surface of the guide rail 34 retaining the clamping mechanism 56 on the guide rail 34.

Referring to FIG. 2, the clamping mechanism 56 is moved along the rails 32 and 34 by action of a horizontally disposed threaded rod 64. The clamping mechanism 56 engages the threaded rod 64 with a nut 66 that is fixedly attached to the bottom of the base plate 58. The rod 64 is rotatably attached at an end 68 to the support frame 22 such that when the rod is turned, the clamping mechanism 56 moves in the direction of arrow 70 depending on which direction the rod 64 is turned. It should also be understood that the clamping mechanism 56 is retained in a fixed position when the rod 64 is not being turned.

The clamping mechanism 54 is slidably moved along the guide rails 32 and 34 preferably by a hydraulic system 72. The hydraulic system 72 provides sufficient force to permit the user to tighten a spliced cable so that the cable can be properly insulated, as will be discussed subsequently.

The hydraulic system 72 preferably includes a motor 74, a hydraulic valve 76, a double action hydraulic cylinder or actuator 78, a reservoir 80 located within the interior of one of the vertical members 26 and suitable conduit fluidly connecting each of the members of the hydraulic system 72 with each other in a conventional and well known manner.

The rod end of the actuator 78 is pivotally attached at one end 82 to a bracket 84 which is attached to a bottom surface of the clamping mechanism 54. The actuator 78 is pivotally attached at its other end 86 to the support frame 22. Electrical power from a suitable power source is provided by an electrical cord 88 through a switch box 90 to the motor 74. The motor 74 drives a pump to provide hydraulic fluid under pressure in a well known manner. The hydraulic valve 76 is actuated by a lever 92 so that the user can selectively direct the hydraulic fluid to actuate the actuator 78 to move the second clamping mechanism 54 in a directions indicated by arrow 94.

Referring to FIG. 4, the clamping mechanism 54 includes a pair of generally upright support plates 96 and 98 which are spaced from each other and welded proximate their lower portions to the base plate 58. A pair of upper securing plates 100 and 102 are pivotally connected to the upright support plates 96 and 98, respectively. A pivotal connector 104 pivotally connects the upper securing plate 100 to the upright support plate 96. A similar pivotal connector (not shown) pivotally connects the upper securing plate 102 to the upright support plate 98. Each pivotal connector preferably includes a pair of upwardly extending tabs 106 that are welded to the upright support plate at their lower ends and a bolt 108 extending through aligned apertures in the upper ends of the tabs 106 and through an aperture in the cooperating securing plate.

The upper securing plates 100 and 102 each have an arcuate edge 101, 103, that cooperates with arcuate edges 105, 107, respectively, of the support plates 96 and 98 to form a generally circular surface when the plates 100 and 102 are in a down position. When the plates 100 and 102 are in the down position, the circular surface formed by arcuate edges 101, 105, 103, 107 surround the cable 21 and restricts longitudinal and radial movement of a clamping device 110 which clamps the cable 21. The plates 100 and 102 are retained in the down position by a simple well-known clasp, generally indicated at 109 and as best seen in a clasped position in FIG. 3, and in an unclasped position in FIG. 4.

A separate cable clamping device 110 is disposed between the sets of plates 96, 100 and 98, 102, as indicated in FIG. 4. The device 110 forms a split spool and includes an upper half 112 and a lower half 114. The upper half 112 includes first and second spaced apart semi-circular flange plates 116 and 118, respectively. The spaced apart semi-circular plates are connected to each other by a rigid horizontally disposed angle iron-shaped housing 120, as illustrated in FIG. 3. Similarly, the lower half 114 includes first and second semi-circular flange plates 122 and 124, as illustrated in FIG. 4, connected by a generally horizontally disposed angle iron-shaped housing 126, as illustrated in both FIGS. 3 and 4.

Upper front and back connector bars 128 and 130, respectively, are preferably welded to the longitudinal side edges of housing 120. Likewise, lower front and back connector bars 132 and 134 are preferably welded to the housing 126. The bars 128, 130 and 132, 134 extend along the entire length of upper and lower housings 120 and 126, respectively. The upper and lower connector bars 128, 130, 132 and 134 serve at least two purposes. First, the front connector bars 128 and 132 have aligned holes through which bolts 136 extend (see FIG. 3). Similarly, the back connector bars 130 and 134 also have aligned holes through which bolts 138 extend. The bolts 136 and 138 connect the upper and lower housings 120 and 126. Second, the connector bars 128, 130, 132 and 134 provide a point of engagement for turning the cable clamping device 110 in an angular direction, as will be discussed subsequently.

Upper and lower semi-cylindrical cable grips 140 and 142, respectively, are disposed adjacent inner surfaces of the upper and lower housings 120, 126, respectively, so that the inner cylindrical surfaces of grips 140, 142 face each other. A plurality of cap screws 146 are threaded through nuts 148 which are welded onto the upper and lower housings. The nuts 148 are aligned with apertures in the housings 120, 126 near the respective connector bars. Distal ends of the bolts 146 engage the outer surfaces of the upper and lower grips 140, 142 so that the grips are pushed against the cable 21 positioned in the clamping device to frictionally grip the cable. Each of the upper and lower grips has a radius smaller than the radius of the cable so that the grips do not contact each other when clamping a cable.

To accommodate different cable diameters, semi-cylindrical grips of different radii are placed between the upper and lower housings 120, 126. Consequently, the cable clamping device 110 can securely clamp cables of different diameters using the same housings.

When the clamping device 110 is in a clamping position, the upper and lower semi-circular plates 116 and 122 and the upper and lower semi-circular plates 118 and 124 rotatably engage with their peripheral edges a plurality of rollers 150. The rollers 150 are rotatably attached to the upright support plates 96 and 98 and to the upper securing plates 100 and 102. As best illustrated in FIG. 3, the rollers 150 are preferably arranged in a triangular configuration. Two of the rollers are positioned on the upright support plate 96 at the corners of the base of the triangular configuration and one roller at an apex located on the upper securing plate 100. Likewise, a pair of rollers are preferably disposed on the upright support plate 98 and a single roller on the upper securing plate 102.

The structure of the roller 150 is shown in greater detail in FIG. 5. The roller 150 may be a standard sealed bearing having an inner race and outer race. The inner race is attached, for example, to the securing plate 100 by a bolt 152 extending through an aperture 154 in the plate 100 and through an aperture 156 in the inner race. A nut 158 on the bolt secures the inner race on the bolt. The outer race will then rotate relative to the inner race to form the roller.

To secure the cable clamping device 110 in a fixed angular position, a braking device 160 is placed on one of the upright support plates, such as plate 96. As best illustrated in FIG. 6, the braking device 160 includes a rod 161 having a handle portion 162 and a threaded portion 163 preferably perpendicularly disposed with respect to the handle portion 162. The threaded portion 163 threadably engages a nut 164 welded onto the support plate 96. The nut 164 is aligned with an aperture 166 in the support plate 96. The threaded portion 163 extends through nut 164 and aperture 166 and through an aperture 168 of a braking plate 170. The braking plate 170 is attached at a lower end to the plate 96 by a nut and bolt 172. A nut 174 is fixedly attached to the threaded portion 163 proximate its distal end with the braking plate 170 being positioned between the nut 174 and the plate 96. The aperture 168 is sufficiently large to permit the threaded portion 163 to freely rotate and to move in a direction along its axis, as indicated by arrow 176.

In use, when the handle 162 is turned in an angular direction, as indicated by arrow 178, the distal end of the handle 162 will move in the direction of arrow 176, due to its threaded engagement with the fixed nut 164. As is easily understood, depending on whether the handle portion is moved to the right or left, the braking plate 170 will either squeeze or move away from the semi-circular plate 122. Both clamping mechanisms 54 and 56 have at least one braking device 160.

Referring to FIG. 2, a turning tool 180 is provided for turning the cable clamping device 110 in an angular direction, as indicated by arrow 181. The turning tool 180 includes a jaw 182 and a handle portion 183. The jaw 182 is configured to engage any of the bars 128, 130, 132 or 134 sufficiently so that the device 110 is angularly rotatable when the braking device 160 is loosened and the tool 180 is pulled by the handle portion in the direction desired.

When the securing plates 100 and 102 are pivoted to the down position cooperating with the support plates 96 and 98, respectively, the rollers 150 engage the peripheral surfaces of the semi-circular plates 116, 118, 122 and 124 of the clamping device 110. The securing plates 100 and 102 and the support plates 96 and 98 secure the clamping device 110 in both the radial and axial direction.

A plurality of individual conductor supports 184 are positioned above the rails 32 and 34 between the clamping mechanisms 54 and 56 to support the individual conductors of the cable during splicing, as illustrated in FIG. 2. Up to six conductor clamps have been used in a working embodiment of the present invention. The conductor supports 184 are positioned on rigid support rods 186, as illustrated in FIGS. 1 and 2. The rods 186 in turn are supported by extending through apertures disposed in the support plates 96 and 98 of the clamping mechanisms 54 and 56.

The rods 186 are retained in a fixed longitudinal position by thumbscrew clamps 188, as illustrated in FIG. 3. The thumbscrew clamps 188 are positioned preferably between the support plates 96 and 98 of the clamping mechanism 54. The thumbscrew clamps 188 are fixedly attached to the base plate 58 and include a spring steel squeezing member 190 that frictionally engages the surface of the rod 186 and a thumbscrew cap 192 having a threaded rod portion 194. The rod portion 194 extends freely through a top portion of the spring steel and threadably engages a bottom portion of the spring steel member thereby squeezing the rod 186 when the thumbscrew cap is turned, frictionally engaging the rod.

Figure 7:
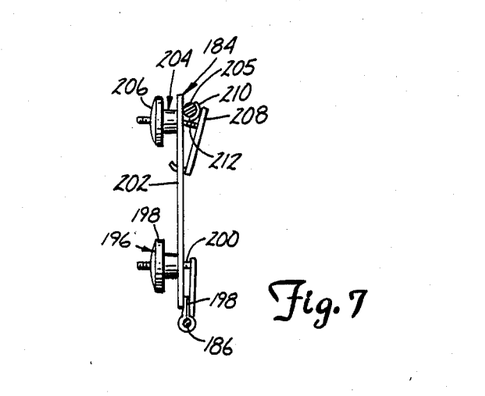
FIG. 7 is an elevational view of the individual conductor clamp of the cable splicing apparatus of the present invention.

The conductor support 184 is best seen in FIG. 7. The conductor support 184 is held in a substantially upright position or any angular position by a conductor support thumbscrew clamp 196. Similar to the thumbscrew clamps 188, the conductor support thumbscrew clamp 196 includes a conductor support plate 202, a thumbscrew cap 198 with a threaded rod portion 200, and a spring steel squeezing member 198. The threaded portion 200 freely extends through the conductor support plate 202 and threadably engages the squeezing member at the other end. As is easily understood, when the cap screw 198 is turned in the proper direction, the squeezing member 186 is placed in a clamping position frictionally engaging the rod 186 and providing sufficient support so that the conductor 184 can be positioned along any point of the rod 186 and in any selected angular position.

The conductor support 184 further includes a conductor clamp 204 for clamping and holding a conductor 205 of the cable 21 in a secure and fixed position while the conductor is being spliced. The conductor clamp 204 includes a thumbscrew cap 206, a clamping plate 208, a conductor gripping member 210, and a threaded rod 212, fixedly attached at one end to the clamping plate 208, extending through the conductor support plate 202 and threadably engaging the thumbscrew cap 206 at the other end. As is easily understood from the figures, when the cap screw 206 is turned in the proper direction, the conductor 205 is frictionally held in position by being squeezed by the gripping member 210 against the support plate 202. The conductor clamp 204 is also used to hold ground conductors and other types of conductors during splicing.

In use, the apparatus 10 of the present invention is used to splice damaged cable on site, in an easy and efficient manner, without having to move the cable. The damaged cable, if not completely severed, is cut in two and the damaged portion of the cable removed. As illustrated in FIG. 2, one end portion 214 of the cable 21 is supported on the cable support 38 and placed on the lower cable grip 142 of the clamping mechanism in a forward position, as illustrated in FIG. 4. The upper semi-cylindrical cable grip 140 is then placed on the cable and the upper and lower housings 120 and 126 are secured to each other by tightening bolts 136 and 138, as illustrated in FIG. 3. The upper securing plates 100 and 102 are then placed in a clamping position to prevent the device 110 and the cable from moving along the longitudinal axis or in a radial direction. In addition, the brake 160 is also tightened to prevent the device 110 from rotating in an angular direction. The cap screws 146 are threaded sufficiently inwardly so that the cable gripping plates 140 and 142 frictionally grip the outer insulative surface of the cable 21 to prevent longitudinal movement of the cable.

A cable end portion 216 is similarly clamped within the clamping mechanism 56 as the cable end portion 214 was clamped in the clamping mechanism 54. The clamping mechanisms 54, 56 are spaced from each other so that a sufficient length of the individual conductor is disposed between the clamping mechanisms to permit the individual conductors to be separated from each other, as illustrated in FIG. 2. The individual conductors are preferably spliced in a staggered fashion and sufficient conductor length is needed to stagger the splices. An individual conductor 220 of the cable end portion 214 and an individual conductor 222 of the cable end portion 216 are placed and held in conductor clamps 204, as illustrated in FIG. 2. The ends of the conductors 220 and 222 are positioned and retained in place by the conductor clamps with the ends of the conductors substantially abutting each other. The clamping mechanism may be moved toward each other to bring the conductors closer together, after the cable ends are clamped by operating actuator 78 to extend the actuator rod and slide the clamping mechanism 54 on its supports.

A sleeve 224 is positioned around the end portions of conductors 220 and 222 and crimped in place, securing each of the end portions to each other. The sleeves 224 are preferably staggered. Alternatively, the ends of the conductors can be soldered together. If the end portions of conductors 220 and 222 are spaced too far apart, the position of the clamping mechanism 56 can be adjusted precisely by turning the threaded rod 64 in the appropriate direction. After the conductor is spliced, the spliced conductor is removed from the conductor clamps and the next set of conductors is placed in the conductor clamps for splicing. Each individual conductor is spliced in the manner described above, including ground conductors and any other wires within the cable 21. After the individual conductors are spliced, the conductors are individually insulated, for example, with insulating tape.

Figure 8:
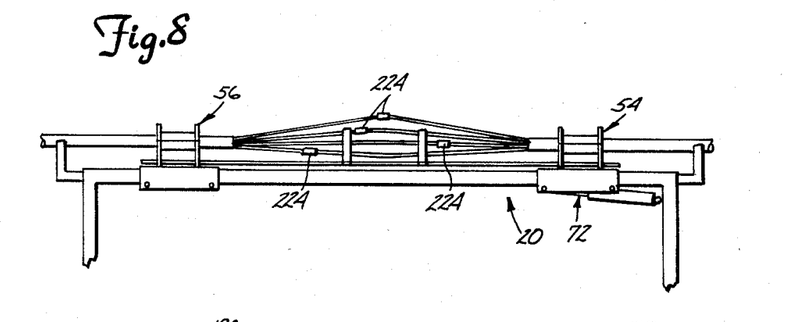
FIGS. 8–10 are illustrative views of the manner of use of the apparatus of the present invention.
Figure 9:
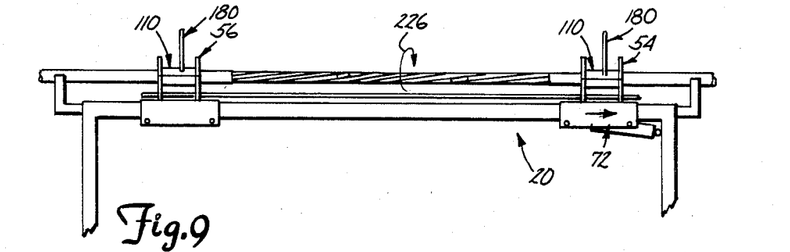
Figure 10:
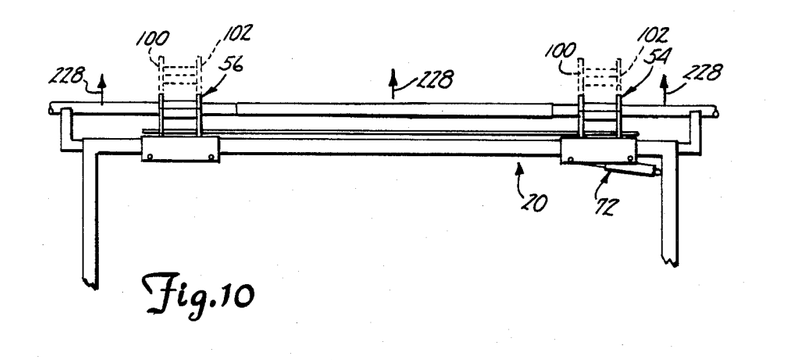

FIGS. 8–10 are illustrations which diagrammatically show the remaining steps that are used to complete the splicing of the cable. As a result of each of the individual conductors having been bent away from each other for splicing purposes, the individual spliced conductors are spaced from each other as illustrated in FIG. 8. The individual conductors, however, need to be drawn together so that the spliced section as a whole may be properly reinsulated. To this effect, the hydraulic system 72 is actuated to move the clamping mechanism 54 to the right in FIG. 2, away from clamping mechanism 56. With the clamping mechanism 56 in stationary position, moving the clamping mechanism 54 with actuator 78 will stretch the spliced individual conductors and bring the spliced connectors adjacent to each other.

Next, the tool 180 is used to engage one of the rotatable clamping devices 110 while the braking device is loosened to permit rotation of the clamping device 110 and provide a slight twist within the spliced section of the cable. Preferably, only one clamping device 110 at a time is released from a braking position. After the braking device has been placed in a loosened or non-braking position, the device 110 is turned by pulling or pushing on the handle of the tool 180 thereby twisting the cable, as indicated by arrow 226 in FIG. 9.

After the cable has been twisted, the spliced section of cable is reinsulated from the environment by any number of well-known methods. One well-known method includes providing a cast around the spliced section and pouring into the cast a room temperature curing rubber compound. After the rubber compound cures, the cast is removed and a permanent exterior rubber cover is put on the cured compound.

After the cable has been spliced and the spliced section reinsulated, the cable is removed from the clamping devices 110 and the securing plates 100, 102 in the direction of the arrows 228.

In summary, the cable splicing apparatus of the present invention provides a structure that holds damaged ends of a cable in proper position while the individual conductors are re-attached to each other and provides a mechanism for drawing the splices of the individual conductors to each other by placing a tension in the conductors and for twisting the spliced section of cable while tension is maintained. The apparatus is portable and may be moved to the site where the cable is to be spliced, eliminating the need for moving the cable.

Although the present invention has been described with reference to preferred embodiments, workers skilled in the art will recognize that changes may be made in form and detail without departing from the spirit and scope of the invention.

What is claimed is:

1. An apparatus for holding and positioning a first multi-strand cable end portion and a second multi-strand cable end portion during splicing and wherein the first and second multi-strand cable end portions each have a plurality of electrical conductors, the apparatus comprising:
a support frame having an upper support surface;
first means for clamping the first multi-strand cable end portion movably disposed on the support frame;
second means for clamping the second multi-strand cable end portion disposed on the support frame;
hydraulic means for moving the first and second means for clamping in an axial direction of the cable relative to each other as the cable end portions are held in the means for clamping; and
conductor clamping means for clamping the individual conductors and holding the conductors in a selected splicing position attached to the support frame and disposed above the upper support surface and wherein the conductor clamping means includes a plurality of individual conductor clamps, each conductor clamp attached to a corresponding clamp support extending above the upper support surface and clamp support selectively positionable in the axial direction and in an angular direction.

2. The apparatus of claim 1 wherein the support frame includes first and second support rails which the first and second means for clamping slidably engage.

3. The apparatus of claim 1 wherein the first means for clamping includes a cable clamping device rotatably mounted within first and second clamping supports wherein the first and second clamping supports restrict movement of the cable clamping device in the axial and radial directions.

4. The apparatus of claim 3 wherein the first means for clamping further includes means for selectively restricting movement of the cable clamping device in an angular direction.

5. The apparatus of claim 3 wherein the cable clamping device includes means for frictionally engaging the first cable end portion and means for providing a force for sufficient frictionally clamping the first cable end portion.

6. The apparatus of claim 5 wherein the means for providing a force for frictionally clamping includes first and second housing sections with a first and second plurality of threaded rods, respectively, in threaded engagement with the respective housing section and each rod having a distal end extending inward radially and wherein the means for frictionally engaging includes first and second clamping grips in touching relationship with the distal ends of the first and second plurality of rods, respectively, and having partial arcuate surfaces for frictionally engaging an outer surface of the first cable end portion.

7. The apparatus of claim 1 wherein the second means for clamping includes a second cable clamping device rotatably mounted within first and second cable supports and means for selectively restricting movement of the cable clamping device in the axial and radial directions.

8. The apparatus of claim 7 wherein the second means for clamping includes means for selectively restricting movement of the cable clamping device in an angular direction.

9. The apparatus of claim 7 wherein the second cable clamping device includes means for frictionally engaging the second cable end portion and means for providing a force for frictionally clamping the second cable end portion.

10. The apparatus of claim 9 wherein the means for providing a force for frictionally clamping includes first and second housing sections with a first and second plurality of threaded rods, respectively, in threaded engagement with the respective housing section and each rod having a distal end extending inward radially and wherein the means for frictionally engaging the second cable end portion includes first and second clamping grips in touching relation with the distal ends of the first and second plurality of rods, respectively, and having partial arcuate surfaces for frictionally engaging an outer surface of the second cable end portion.

11. The apparatus of claim 1 wherein the hydraulic means is coupled to control movement of the first means for clamping and further including means for selectively moving the second means for clamping along the upper support surface.

12. The apparatus of claim 1 wherein the conductor clamping means is slidably positioned with respect to the support surface and is slidable in the axial direction of the cable.

13. The apparatus of claim 1 wherein each of the conductor clamps are movably attached to the clamp support and are movable along an axis of the clamp support.

14. A method for splicing a first multi-strand cable end portion with a second multi-strand cable end portion, each multi-strand cable end portion having a plurality of individual conductors, the method comprising:
positioning the first and second multi-strand cable end portions within first and second clamping mechanisms, respectively;
positioning and separating a plurality of the individual conductors of the first multi-strand cable, each conductor in a separate conductor clamp and positioning and separating a plurality of the individual conductors of the second multi-strand cable, each in a separate conductor clamp, so that ends of corresponding conductors of the first and second multi-strand cables are in substantial alignment with individual conductors of the same multi-strand cable being in a retained spaced-apart relationship with each other;

splicing individually one conductor of the first multi-strand cable end portion with one conductor of the second multi-strand cable end portion and continuing splicing until all the individual conductors of the first and second multi-strand cable end portions are spliced;

moving the first clamping means away from the second clamping means to stretch and straighten and bring together all the spliced individual conductors; and rotating the first clamping means in an angular direction so that the spliced conductors are placed in an angular twisted relationship with respect to the axis of the first and second cable end portions.

15. The method of claim 14 and further comprising: insulating each of the individual conductors after each of the individual conductors are spliced.

16. The method of claim 14 and further comprising: insulating the individual conductors from the environment after the individual conductors are placed in an angular twisted relationship.

* * * * *